United States Patent Office 3,574,835
Patented Apr. 13, 1971

3,574,835
USE OF NITROALKYL ACID SULFATES AND NEUTRALIZATION PRODUCTS THEREOF AS MICROBIOCIDES
Richard E. Berkley, Edmonton, Alberta, Canada, and Carl O. Tant, Houston, Tex., assignors to Nalco Chemical Company, Chicago, Ill.
No Drawing. Continuation-in-part of application Ser. No. 411,095, Nov. 13, 1964. This application June 3, 1966, Ser. No. 554,979
The portion of the term of the patent subsequent to May 13, 1986, has been disclaimed
Int. Cl. A01n 9/00
U.S. Cl. 424—244                    17 Claims

ABSTRACT OF THE DISCLOSURE

Nitroalkyl acid sulfates and neutralization products thereof are used as microbiocides.

---

This application is a continuation-in-part of U.S. application Ser. No. 411,095, filed Nov. 13, 1964, now abandoned.

This invention relates to a new series of chemical compounds which have proved to have unusual value in activity against a wide variety of deleterious bacteria and fungi which cause serious problems in various industries. These compounds also show activity against other microorganisms.

An object of the invention is to produce new and useful chemical compounds and to provide a process for making such compounds.

A further object of the invention is to provide new chemical compounds which have a rather broad spectrum of utility as microbiocides.

Another object is to provide a new and improved way of destroying microorganisms. Other objects will appear hereinafter.

In accordance with the invention, new and useful compounds have been prepared which can be described as nitroalkyl acid sulfates, salts and addition products thereof. These compounds include not only the free nitroalkyl acid sulfate but also the neutralized products thereof. The preferred group of compounds is derived from 2-nitro-1-butyl acid sulfate. The other position isomers are effective.

The most effective products have been derived from racemic mixtures but the individual optical isomers can be prepared and used for the intended purpose. The degree of effectiveness can vary but good results have been obtained with the racemic mixture.

The neutralizing agents can be any basic material that will react with the acidic hydrogen. Examples of suitable neutralizing agents are: the alkali (e.g., sodium and potassium) and alkaline earth (e.g., calcium, strontium, magnesium) metals, heavy metals (e.g., iron, zinc, manganese, copper, nickel), ammonia, primary, secondary and tertiary amines (e.g., monoethanolamine, diethanolamine, triethanolamine, mixtures thereof, methyl amine, dimethyl amine, trimethyl amine, ethylamine, diethylamine, triethylamine, propylamine, dipropylamine, butylamine, dibutylamine, homologues thereof, hexamethylene tetramine, pyridine, piperidine, morpholine, and the like), cyclic amines (e.g., cyclohexyl amine, dicyclohexyl amine), polyamines (e.g., ethylene diamine, diethylene triamine, triethylene tetramine, tetraethylene pentamine, propylene diamine, dipropylene triamine, phenylene diamine, hydroxyethyl ethylene diamine, and homologues thereof), amido amines (e.g., N-acetyl diethylene triamine), quaternary ammonium bases (e.g., tetramethyl ammonium hydroxide), etc.

It has been discovered that the new compounds, while sharing the anti-microbial activity common to many previously known nitro alcohol derivatives, are distinguishable from such derivatives by their remarkable effectiveness which is not limited to inhibition of specific species of microorganisms. Unlike many previously known and commonly used anti-microbial agents, these compounds are further distinguished therefrom by having cidal as well as static effects when used in unusually low concentrations on such microorganisms. Unlike many common anti-microbial agents, many of these compounds are soluble in all proportions in brines containing in excess of 10% NaCl as well as in fresh waters.

The compounds of the invention are further distinguishable in that closely related members of the series can be made insoluble in water for use in such applications wherein a water soluble chemical is of no benefit or even harmful to the system in question. The new compounds are further distinguishable from many commonly known and used antiseptic substances in that their effectiveness is maintained even when they are used in the presence of large quantities of organic matter.

Unlike many presently known and commonly used anti-microbial agents, our compounds in use concentration are relatively non-toxic to higher forms of life, and have the added benefit of possessing pleasant or mild odors which enable them to be used in a wide variety of applications wherein irritating odors and volatile gases produced by many previously known agents prohibit or reduce the effective use of such agents.

Many members of the present series of new compounds, while exhibiting a high degree of anti-microbial activity alone, can be combined with other disinfectants, soaps, detergents, paints, etc., for use as powerful anti-microbial agents in a wide variety of applications.

The new compounds can be synthesized by reacting a nitroalkyl alcohol with oleum, chlorosulfonic acid, or $SO_3$. The nitroalkyl group preferably contains at least three carbon atoms. The preferred range is 3 to 6 carbon atoms, although the alkyl group can have a greater number of carbon atoms. A single nitro group is preferred but there can be a greater number. In the best mode contemplated for the practice of the process, they were synthesized by the reaction between a nitrobutanol and chlorosulfonic acid to yield the corresponding nitro butyl acid sulfate which can be used alone or further reacted with other compounds as shown in the examples below. This process can be carried out at moderate temperatures.

The following examples illustrate but by no means limit the invention in any way. Unless otherwise indicated, the quantities are by weight:

EXAMPLE A 116 gm. of chlorosulfonic acid is slowly added to 119 gm. of 2-nitro-1-butanol at a temperature less than 30° C., then heated to 50° C. for one-half hour under vacuum to remove HCl and yield the product 2-nitro-1-butyl acid sulfate of the formula

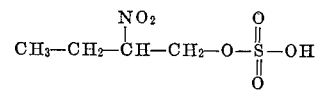

EXAMPLE B 116 gm. of chlorosulfonic acid is slowly added to 119 gm. of 2-nitro-3-butanol at a temperature less than 30° C., then heated to 50° C. for one-half hour under vacuum to remove HCl and yield the product 2-nitro-3-butyl acid sulfate to the formula

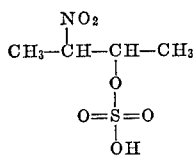

EXAMPLE C 116 gm. of chlorosulfonic acid is slowly added to 119 gm. of 1-nitro-2-butanol at a temperature less than 30° C., then heated to 50° C. for one-half hour under vacuum to remove HCl and yield the product 1-nitro-2-butyl acid sulfate to the formula

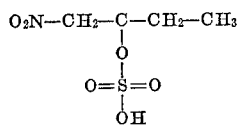

EXAMPLE D

The procedure is the same as in Example A except that 3.2 parts of 2-nitro-1-pentanol is reacted with 2.69 parts chlorosulfonic acid to yield 2-nitro-1-pentyl acid sulfate.

EXAMPLE E

The procedure is the same as in Example A except that 3.2 parts of 2-nitro-1-propanol is reacted with 3.25 parts of chlorosulfonic acid to yield 2-nitro-1-propyl acid sulfate.

EXAMPLE F

The procedure is the same as in Example A except that 3.6 parts of 2-nitro-2-methyl-1-propanol is reacted with 3.6 parts of chlorosulfonic acid to yield 2-nitro-2-methyl-1-propyl acid sulfate.

The foregoing products have a high degree of activity against various harmful micro-organisms. However, this activity can be remarkably increased by using as the antimicrobial agent various derivatives. Examples of some of the preferred derivatives are:

EXAMPLE 1

205 gm. of the product of Example A is added slowly to a mixture consisting of 100 g. of a 50% solution of sodium hydroxide, 100 gm. water and 50 gm. n-propanol. The reaction mixture is stirred at 30° C. until completed to yield the finished product of the formula

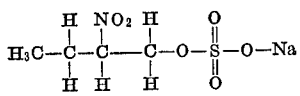

EXAMPLE 2

205 gm. of the product of Example A is added slowly to a mixture consisting of 110 gm. of pyridine dissolved in 50 gm. of n-propanol. The reaction mixture is stirred at 30° C. until completed and 100 gm. of water is added to yield an aqueous solution of the finished addition product of the formula

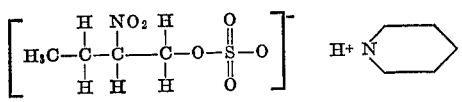

EXAMPLE 3

199 gm. of the product of Example A is added slowly to a mixture consisting of 170 gm. of triethanolamine and 50 gm. of n-propanol. The reaction mixture is stirred at 30° C. until reaction is completed and 100 gm. of water is added to yield an aqueous solution of the finished addition product of the formula

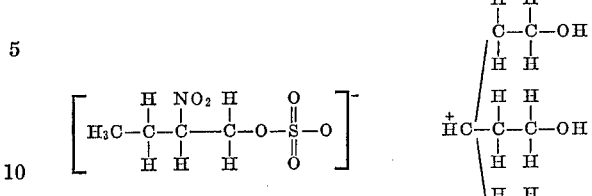

EXAMPLE 4

138 gm. of the product of Example A is added slowly to 650 gm. of a 37.9% aqueous solution of an ethylene oxide derived quaternary ammonium base of soy dimethyl amine and stirred at 30° C. until completed to yield the finished product of the following formula, which is an ethylene oxide adduct of dimethyl soy amine.

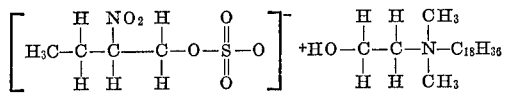

EXAMPLE 5

100 gm. of the product of Example A is added slowly to 55 gm. of hexamethylene tetramine dissolved in 100 gm. of n-propanol. The reaction mixture is stirred at 30° C. until completed to yield the finished product of the formula

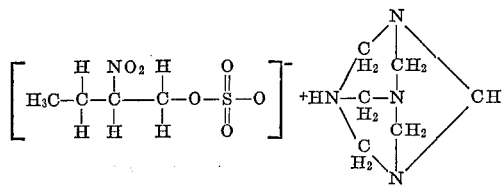

EXAMPLE 6

The procedure is the same as Example 1 except that the chemically equivalent amount of sodium carbonate is employed instead of sodium hydroxide to yield 2-nitro-1-butyl sodium sulfate.

EXAMPLE 7

The product of Example D is added slowly to 2.55 parts of pyridine dissolved in 4 parts of water and stirred at 30° C. to yield a solution of the pyridine salt of 2-nitro-1-pentanol acid sulfate.

EXAMPLE 8

7.2 parts of the product of Example B is added slowly to 3.1 parts of pyridine in 1.5 parts of n-propanol and stirred at 30° C. until reaction is complete and 3.0 parts of water is added to yield an aqueous solution of the pyridine salt of 2-nitro-3-butyl-acid sulfate.

EXAMPLE 9

6.4 parts of the product of Example E is added slowly to 2.7 parts of pyridine in 2.0 parts of n-propanol and stirred at 30° C. until reaction is complete and 4.0 parts of water is added to yield an aqueous solution of the pyridine salt of 2-nitro-1-propyl acid sulfate.

EXAMPLE 10

7.2 parts of the product of Example A is added slowly to a solution of 3.7 parts of 3-amino-2-butanol in 1.5 parts of n-propanol and stirred at 30° C. until reaction is complete, and 3 parts of water is added to yield an aqueous solution of 2'-hydroxy butyl-3'-amine salt of 2-nitro-1-butyl acid sulfate.

EXAMPLE 11

7.2 parts of the product of Example F is added to 2.7 parts of pyridine in 1.5 parts of n-propanol and stirred at 30° C. until reaction is complete and 3 parts of water is added to yield an aqueous solution of the pyridine salt of 2-nitro-2-methyl-1-propyl acid sulfate.

EXAMPLE 12

7 parts of 2-nitro-1-butyl acid sulfate (product of Example A) is added slowly to 35 parts of a 26% aqueous solution of tetra(hydroxyethyl)ammonium hydroxide and stirred at 30° C. until reaction is complete to give a quaternary addition product in water.

EXAMPLE 13

12 parts of 2-nitro-1-butyl acid sulfate (product of Example A) is added slowly to 50 parts of a high molecular weight polyethylene imine (Nalco D–1988) aqueous solution and stirred at 30° C. until reaction is complete to give a polyethylene imine addition product.

EXAMPLE 14

20 parts of 2-nitro-1-butyl acid sulfate (product of Example A) is added slowly to 50 parts of a condensation product of 3450 parts of tall oil and 4500 parts of triethanol amine heated with the elimination of water beginning at 165° C. and ending at 300° C. over a period of 12 hours followed by the addition of 3740 parts of n-propanol at 90° C. The resultant product is an addition product or salt of the esterified amine and the 2-nitro-1-butyl acid sulfate.

All of the foregoing compositions have been tested and found to be useful as microbiocides against various microorganisms.

In Table 1 there is reported in parts per million (p.p.m.) of the chemicals tested in aqueous media the quantity of chemical required for inhibition or kill of a number of deleterious microorganisms. The testing procedure for sulfate reducing bacteria and slime formers was the official American Petroleum Institute test procedure described in paragraphs 29–37, page 5, of API RP–38: Recommended Practice for Biological Analysis of Waterflood Injection Waters (1959) with the following minor variations:

Paragraph 32: Screw-capped bacteriological culture tubes, 16 x 125 mm. are substituted for the 1- or 2-oz. bottles.

Paragraph 33: Tubes were read at the end of seven days incubation. Experience has demonstrated that tubes which do not blacken within this time are not likely to do so after further incubation.

Paragraph 34: Test compounds were employed at concentrations of 5, 10, 20, 30 and 40 p.p.m.

The organisms used were:

(a) API S.R.—This strain of Desulfovibrio species is from the test culture of sulfate-reducing bacteria designated as Mid-Continent Strain A by the American Petroleum Institute Study Committee on Biological Analysis of Water to be used for Waterflood Purposes.

(b) Br. S.R.—This organism is similar to the API strain of sulfate reducing bacteria, except that it requires a higher brine. It was originally isolated from a waterflood containing approximately ten percent sodium chloride, but will grow equally well in media containing from five to ten percent. It is not an offcial API test organism. The inhibition test procedure is the same as described above for the API culture except that the media is modified by the addition of the desired concentration of sodium chloride. Unless otherwise indicated in the test results, a ten percent sodium chloride concentration was employed in the test media.

(c) No. 904 Slime Mixture—This culture is a mixed flora of facultative aerobic heterotrophic "slime-forming" bacteria (predominantly Pseudomonas species) isolated by the Visco Laboratories from a Waterflood system. The inhibition test is by standard tube-dilution technique similar to that described for the sulfate reducing bacteria except that it is carried ou in 16 x 150 mm. culture tubes with Willett caps. Test media consists of beef extract (Difco), 1.0 gm., and Tryptone (Difco), 50 gm. per liter of deionized distilled water. Test compounds were employed at concentrations of 5, 10, 20, 30, 40, 50 and 100 p.p.m. All tubes were read after 48 hours incubation.

All tests designate the concentration ranges at which inhibition occurred, the lower number indicating the highest concentration of chemical permitting growth, and the higher number indicating the lowest concentration at which no growth occurred. In some instances the compounds effectively prevented growth at 5 p.p.m. and the inhibitory concentration is shown as <5 (less than 5 p.p.m.).

Similar tube dilution techniques using media approprite to the respective test organisms were used to evaluate the performance of said chemicals against Botryodiplodia species, Thielaveopsis species, four mixed cultures of microorganism respectively isolated from and associated with rotting tomatoes, rotting potatoes, a diseased rose bush and fresh garden soil, and four pathogenic bacteria.

In other tests the microbiocides of the various examples were utilized in preparing formulations with other antimicrobial agents and various solvents and dispersing agents, examples of which are shown in Table 2. The activities of such formulations is shown in Table 3. The activities of various compositions of the invention against four pathogenic bacteria are shown in Table 4.

TABLE 1

| Organism | Inhibitory concentration, p.p.m. | | | | |
|---|---|---|---|---|---|
| | Ex. 1 | Ex. 2 | Ex. 3 | Ex. 4 | Ex. 5 |
| API sulfate reducers (API S.R.) | 40 | 20–30 | 40 | 5–10 | 40 |
| 904 slime formers | 100 | 5 | 10–20 | 5–10 | 10–20 |
| Brine sulfate reducer (Br. S.R.) | | 20–30 | | 30–40; 40 | |
| Botryodiplodia sp | | 5 | 25–50 | | 100–250 |
| Thielaveopsis sp | | 5 | 25–50 | | 100–250 |
| Tomato rot organisms | | 50–100 | | 100 | |
| Potato rot organisms | | 50–100 | | 50–100 | |
| Rose disease organisms | | 10–50 | | 5–10 | |
| Fresh garden soil organisms | | 10–50 | | 100 | |

TABLE 2

CT–385

| | Gm. |
|---|---|
| 1.2 mole epichlorhydrin adduct of $C_{12}$–$C_{14}$ straight chain alcohol (Alfol) quaternized with trimethyl amine | 8.0 |
| Example 2 | 8.0 |
| Tap water | 4.9 |

CT–399

| | |
|---|---|
| 5-nitro-2-furfural diacetate | 1.6 |
| Acetone | 5.0 |
| Propanol | 5.4 |
| Example 4 | 8.0 |

CT–427

| | |
|---|---|
| 5-nitro-2-furfural diacetate | 10.0 |
| Acetone | 40.0 |
| Propanol | 10.0 |
| Example 4 | 40.0 |

CT–428

| | |
|---|---|
| Example 4 | 30.0 |
| Example 2 | 30.0 |

CT–429

| | |
|---|---|
| 5-nitro-2-furfural diacetate | 4.0 |
| Acetone | 12.0 |
| Ethylene glycol 200 monolaurate (pegosperse 200 ML) | 12.0 |
| Example 2 | 12.0 |

TABLE 3

| Formulation: | Inhibitory concentration, p.p.m. | | | |
|---|---|---|---|---|
| | API sulfate Reducer | 904 slime former | Tomato spoilage organisms | Diseased rose organisms |
| CT-385 | | 10-20 | 5-10 | |
| CT-399 | 10-20; 20-30 | | 10-29 | |
| CT-427 | | 10-20 | 5-10 | |
| CT-428 | | | <5 | 50-100 | 5-10 |
| CT-429 | | | 10-20 | |

TABLE 4

| Organism | Inhibitory concentration, p.p.m. | | |
|---|---|---|---|
| | Ex. 2 | Ex. 4 | CT-428 |
| Staphylococcus aureus | 10-50 | <5 | <5 |
| Salmonella schottmuelleri | 10-50 | 10-50 | 10-50 |
| Shigella flexneri | 5-10 | <5 | <5 |
| Klebsiella pneumoniae | 50-100 | 50-100 | 10-50 |

From the foregoing description, it will be seen that the nitroalkyl acid sulfates, their salts, and addition products, possess unusual microbiocidal properties. These products are normally prepared for use as microbiocides by dissolving them or suspending them in a liquid carrier medium. The proportions of the active ingredients in the carrier medium can vary depending upon the intended use, the amount being such that when the microbiocidal composition is introduced into a liquid medium to be treated, the proportion of active microbiocidal agent is 5 to 100 p.p.m.

Among other uses for the compounds and compositions of the invention is the destruction of microorganisms in an aqueous environment, especially in water flooding stysems for the secondary recovery of oil where water is added in an injection well and pumped, along with oil and water displaced from the formation, to a producing well. These waters often contain relatively large amounts of dissolved salts. The compounds and compositions of the invention are effective microbiocides in this environment and inhibit the growth of sulfate reducing bacteria and slime forming bacteria.

It will be apparent that the compounds of the invention are all characterized by a nitroalkyl sulfate nucleus

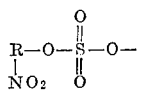

where R represents the alkyl radical. The most valuable products are those having the general formula

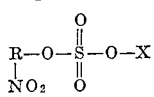

where X is hydrogen or a salt forming group, and especially those in which

is a 2-nitro-1-butyl group. The nitroalkanol sulfonation products can also exist as mixtures where two or more nitroalkanols are used or where the alkanol is polyhydric.

The use of compounds of the present invention in an aqueous environment to inhibit growth of sulfide producing bacteria and/or slime producing bacteria, especially in water flooding operations in the secondary recovery of petroleum from subterranean oil bearing formations is claimed in copending application U.S. Ser. No. 519,961 filed Jan. 11, 1966, now abandoned.

The use of compounds of the present invention as microbiocides for agricultural uses and especially in the banana industry is claimed in copending application U.S. Ser. No. 447,877 filed Apr. 13, 1965, now matured into U.S. Patent 3,444,301.

Under processing conditions described involving amine neutralization, there is evidence that the resulting salt configuration may rearrange on standing to give a possible quaternary ammonium or related structure with no loss of biological activity.

The invention is hereby claimed as follows:

1. A process for destroying micro-organisms selected from the group consisting of bacteria and fungi which comprises contacting such organisms with a bactericidally and fungicidally effective amount of a compound having a nitroalkyl sulfate nucleus, said compound being selected from the group consisting of nitroalkyl acid sulfates and metal, ammonium, amine and quaternary salts thereof wherein a nitro group is substituted for hydrogen on carbon adjacent the carbon to which said sulfate group is attached and the alkyl group contains 3 to 6 carbon atoms.

2. A process as claimed in claim 1 in which said compound is a nitrobutyl acid sulfate.

3. A process as claimed in claim 1 in which said compound is 2-nitro-1-butyl acid sulfate.

4. A process as claimed in claim 1 in which said compound is the sodium salt of 2-nitro-1-butyl acid sulfate.

5. A process as claimed in claim 1 in which said compound is a pyridine salt of a nitroalkyl acid sulfate.

6. A process as claimed in claim 1 in which said compound is the pyridine salt of 2-nitro-1-butyl acid sulfate.

7. A process as claimed in claim 1 in which said compound is the triethanolamine salt of 2-nitro-1-butyl acid sulfate.

8. A process as claimed in claim 1 in which said compound is the hexamethylenetetramine salt of 2-nitro-1-butyl acid sulfate.

9. A process as claimed in claim 1 in which said microorganism is *Staphylococcus aureus*.

10. A process as claimed in claim 1 in which said microorganism is *Salmonella schottmuelleri*.

11. A process as claimed in claim 1 in which said microorganism is *Shigella flexneri*.

12. A process as claimed in claim 1 in which said microorganism is *Klebsiella pneumoniae*.

13. A process as claimed in claim 1 in which said microorganism is *Staphylococcus aureus* and the compound having a nitroalyl sulfate nucleus is the pyridine salt of 2-nitro-1-butyl acid sulfate.

14. A process as claimed in claim 1 in which said microorganism is *Salmonella schottmuelleri* and the compound having a nitroalkyl sulfate nucleus is the pyridine salt of 2-nitro-1-butyl acid sulfate.

15. A process as claimed in claim 1 in which said microorganism is *Shigella flexneri* and the compound having a nitroalkyl sulfate nucleus is the pyridine salt of 2-nitro-1-butyl acid sulfate.

16. A process as claimed in claim 1 in which said microorganism is *Klebsiella pneumoniae* and the compound having a nitroalkyl sulfate nucleus is the pyridine salt of 2-nitro-1-butyl acid sulfate.

17. A substance normally susceptible to the growth of microorganisms selected from the group consisting of bacteria and fungi mixed with 5 to 100 parts per million by weight of an alkali metal salt of a nitrobutyl acid sulfate wherein the nitro group is substituted for hydrogen on the carbon adjacent to the carbon to which said sulfate is attached, and the alkyl group contains 3 to 6 carbon atoms.

References Cited

UNITED STATES PATENTS

| 2,559,751 | 7/1951 | Berry et al. | 260—458 |
| 2,902,401 | 9/1959 | Harwood et al. | 167—22 |
| 2,959,517 | 11/1960 | Bowers et al. | 167—22 |
| 2,977,368 | 3/1961 | Druey et al. | 260—294.8 |
| 2,996,510 | 8/1961 | Green | 260—294.8 |
| 3,133,949 | 5/1964 | Rutkowski et al. | 260—457 |

(Other references on following page)

UNITED STATES PATENTS

| | | | |
|---|---|---|---|
| 2,139,256 | 12/1958 | Bousquet | 167—22 |
| 2,204,976 | 6/1940 | Van Peski et al. | 260—457 |
| 2,340,331 | 2/1944 | Knutson et al. | 252—53 |
| 2,380,011 | 7/1945 | Baker et al. | 167—32 |
| 2,909,554 | 10/1959 | Doerr | 260—458 |
| 2,967,829 | 1/1961 | Bennett | 252—51.5 |
| 2,976,244 | 3/1961 | Bennett | 252—51.5 |
| 3,149,031 | 9/1964 | Stoffel et al. | 167—22 |
| 3,160,655 | 12/1964 | Stoffel et al. | 260—483 |
| 3,444,301 | 5/1969 | Tant et al. | 424—303 |

FOREIGN PATENTS

| | | | |
|---|---|---|---|
| 1,435,772 | 3/1966 | France | 71—103 |

OTHER REFERENCES

McInnis et al.: J. Am. Chem. Soc., vol. 74, p. 2686 (1952).

Chem. Abs., vol. 60, 7381, March 1964.

Tsuboi et al.: "Prevention of Molding of Grain," (1958), CA 52, p. 17560 (1958).

ALBERT T. MEYERS, Primary Examiner

F. E. WADDELL, Assistant Examiner

U.S. Cl. X.R.

424—263, 315, 325, 329

PO-1050
(5/69)

UNITED STATES PATENT OFFICE
CERTIFICATE OF CORRECTION

Patent No. 3,574,835  Dated April 13, 1971

Inventor(s) Richard E. Berkley & Carl O. Tant

It is certified that error appears in the above-identified patent and that said Letters Patent are hereby corrected as shown below:

Column 4, lines 3-13, the formula reading " 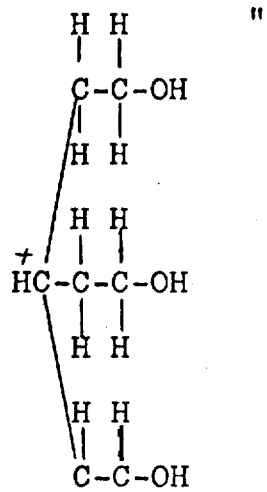 "

should read -- 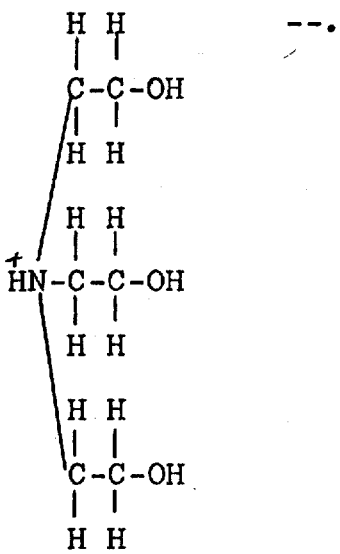 --.

Signed and sealed this 6th day of July 1971.

(SEAL)
Attest:

EDWARD M. FLETCHER, JR.
Attesting Officer

WILLIAM E. SCHUYLER, JR.
Commissioner of Patents